(12) United States Patent
Costanzo et al.

(10) Patent No.: US 6,571,937 B1
(45) Date of Patent: Jun. 3, 2003

(54) SWITCH CONVEYOR

(75) Inventors: Mark Costanzo, River Ridge, LA (US); Angela L. Marshall, Harahan, LA (US)

(73) Assignee: The Laitram Corporation, Harahan, LA (US)

( * ) Notice: Subject to any disclaimer, the term of this patent is extended or adjusted under 35 U.S.C. 154(b) by 0 days.

(21) Appl. No.: 10/065,074

(22) Filed: Sep. 13, 2002

(51) Int. Cl.[7] ............................................. B65G 17/00
(52) U.S. Cl. .................. 198/779; 198/845; 198/370.09; 198/370.03
(58) Field of Search ................ 198/845, 779, 198/370.09, 370.03

(56) References Cited

U.S. PATENT DOCUMENTS

| | | | |
|---|---|---|---|
| 3,550,756 A | 12/1970 | Kornylak | 198/183 |
| 4,410,081 A * | 10/1983 | Weihe, Jr. | 198/725 |
| 5,238,099 A | 8/1993 | Schroeder et al. | 198/456 |
| 5,404,997 A | 4/1995 | Schreier et al. | 198/779 |
| 5,551,543 A | 9/1996 | Mattingly et al. | 198/370.09 |
| 6,073,747 A | 6/2000 | Takino et al. | 198/370.09 |
| 6,148,990 A * | 11/2000 | Lapeyre et al. | 198/779 |
| 6,318,544 B1 * | 11/2001 | O'Connor et al. | 198/853 |
| 6,318,554 B1 | 11/2001 | O'Connor et al. | 198/853 |
| 6,494,312 B2 * | 12/2002 | Costanzo | 198/779 |
| 2001/0045346 A1 | 11/2001 | Costanzo | 198/853 |

OTHER PUBLICATIONS

Sandvik Sorting Systems, "Singulator–Linear Singulator Flow Controller," 2001, Sandvik Sorting Systems.

* cited by examiner

Primary Examiner—Christopher P. Ellis
Assistant Examiner—Richard Ridley
(74) Attorney, Agent, or Firm—James T. Cronvich

(57) ABSTRACT

A switch conveyor including a modular conveyor belt or mat divided into longitudinal lanes of rollers. All the rollers in a lane are arranged to rotate about axes oriented in a common direction. The rollers in an adjacent lane are arranged to rotate about axes oriented in a different direction. A switch mechanism underlying the conveyor belt along a carryway selectably contacts the bottom side of the belt or mat with bearing surfaces that rotate the rollers in selected lanes along the carryway to propel conveyed articles in one direction or another.

40 Claims, 7 Drawing Sheets

SWITCH CONVEYOR

BACKGROUND OF INVENTION

The invention relates generally to power-driven conveyors and, more particularly, to switch conveyors including conveyor belts with selectively rotatable rollers useful in diverting conveyed articles to selected positions across the width of the belt.

In a typical beverage industry application, cans or bottles are sequentially filled in a filler, warmed in a warmer, packaged in a case packer, and loaded onto a pallet by a palletizer. Multiple palletizers are often used so as not to bottleneck any of the upstream processes, such as the filler. Shoe sorters are often positioned just before the palletizers to distribute conveyed cases of filled cans or bottles among lateral belt positions leading to individual outfeed conveyors each transporting the cases to one of the palletizers according to the palletizers' availability.

One typical shoe sorter includes an endless conveyor belt or chain constructed of a series of slats flanked by drive chains. A shoe for pushing articles across the conveyor belt is movably attached to each slat. Typically, the shoe either surrounds the slat, top to bottom and front to back, or has an appendage that extends through a transverse slot formed through the slat from top to bottom. A guide track arrangement in the conveyor frame beneath the conveyor belt guides the shoes across the belt as the belt is driven in the conveying direction. The specific arrangement of the guide track programs the system to push conveyed articles to specified lateral positions on the conveyor belt.

But these chain-driven slat conveyors have shortcomings. One is that their construction limits the placement of connecting joints between consecutive slats because of interference with the shoes and associated appendages. For that reason, the slats can sag in the middle because they are supported mainly at the drive chains positioned out of the shoe's travel range at the side edges of the slats. This problem is especially noticeable on wider conveyors. Another shortcoming is that the shoe mechanisms and the guide track arrangement can be complex and, consequently, expensive.

Roller conveyors are also used as shoe sorters in many applications, especially for heavy articles, such as tires, and also for beverage cases and for low-profile, multi-sized articles, such as packages and mail. But one of the problems with roller conveyors is that these metal conveyors can be noisy, especially as their bearings wear. Frequent maintenance operations, such as lubricating and tightening, and repairs are a way of life with roller conveyors.

Thus, there is a need for a conveyor that can divert conveyed articles, such as cases and packages, but without the shortcomings of shoe sorters or roller conveyors.

SUMMARY OF INVENTION

These needs and others are satisfied by a switch conveyor embodying features of the invention. One version of the conveyor includes a conveyor belt with rollers arranged in first and second lanes. A plurality of parallel longitudinal bearing surfaces underlies the conveyor belt along a belt carryway. The bearing surfaces are selectably moveable into and out of contact with the bottom side of the belt and the first and second lanes of rollers along the carryway. The conveyor belt, which extends in width from a left side to a right side and in thickness from a top side to a bottom side, runs longitudinally in a direction of belt travel along the carryway. A plurality of first rollers is arranged to rotate about first axes disposed at a first angle relative to the direction of belt travel. The first rollers are arranged to define the parallel longitudinal first lanes. Similarly, a plurality of second rollers is arranged to rotate about second axes disposed at a different second angle. The second rollers define the second lanes. The first and second lanes alternate across the width of the belt.

Another version of the switch conveyor includes a modular conveyor belt with rollers and a switch mechanism. The modular conveyor belt is constructed of a series of rows of belt modules connected end to end at hinges. At least some of the rows include rollers that can extend above and below top and bottom sides of the belt. First and second groups of the rollers can rotate about axes generally in different first and second directions. The first group of rollers is arranged in spaced apart longitudinal first lanes, and the second group, in spaced apart longitudinal second lanes. The switch mechanism, which underlies the belt along a carryway portion of the conveyor, is selectably adjustable between contact with the first group of rollers at the bottom side of the belt under the first lanes and contact with the second group of rollers in the second lanes. As the switch mechanism selectably contacts the first or second groups of rollers, it causes the selected group to rotate as the conveyor belt advances along the carryway.

In a third version of the switch conveyor, a conveyor mat is divided across its width into a plurality of longitudinal lanes of rollers. All the rollers in each lane rotate about parallel axes. The rollers of adjacent lanes rotate about non-parallel axes. A switch mechanism underlies a carryway portion of the conveyor and is adjustable between lanes to rotate the rollers of alternately selectable lanes.

BRIEF DESCRIPTION OF DRAWINGS

These and other features, advantages, and aspects of the invention are described in more detail in the following description, appended claims, and accompanying drawings, in which:

DETAILED DESCRIPTION

Figure 1:
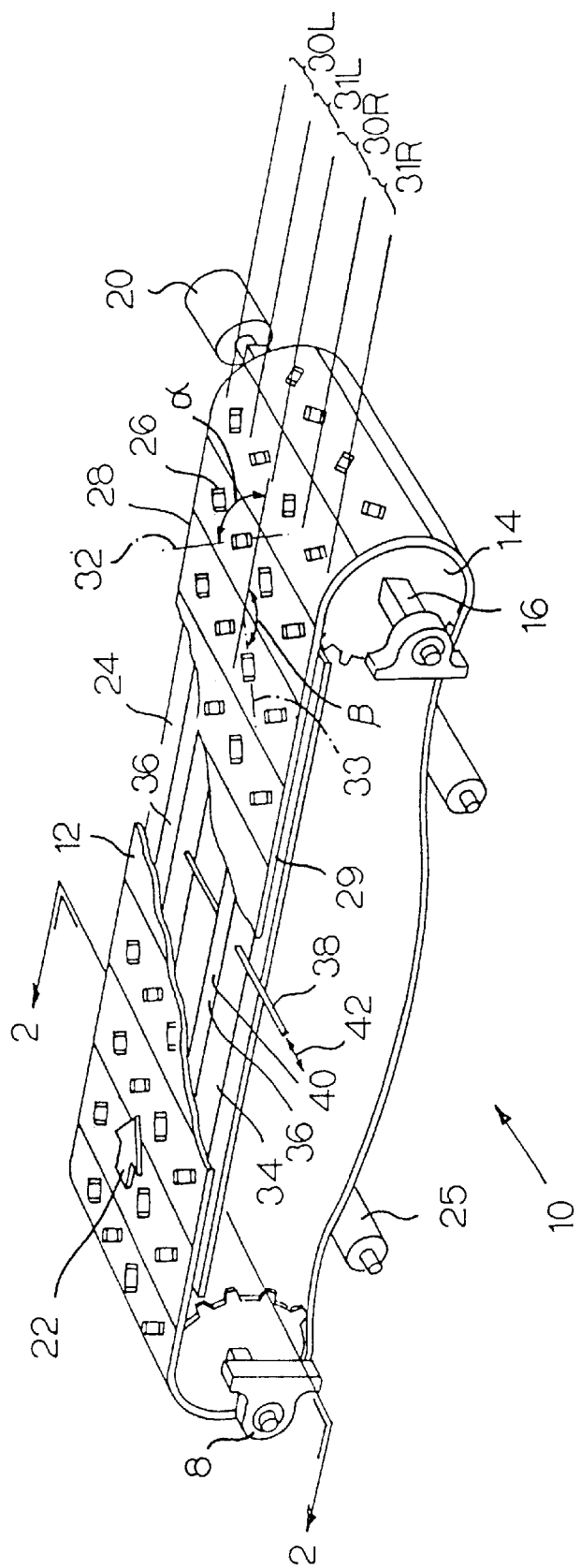
FIG. 1 is an isometric view, partly cut away, of one version of a switch conveyor embodying features of the invention.

A switch conveyor embodying features of the invention including a roller-top conveyor belt is shown in FIG. 1. The conveyor 10 includes a conveyor belt 12 supported in a conveyor frame. The belt is an endless conveyor belt looped around pulleys or sprocket sets 14, which are mounted on shafts 16 rotatably supported in bearing blocks 18 attached to the conveyor frame. A motor 20, coupled to the shaft at one end of the conveyor, drives the belt in a direction of belt travel 22. No motor is shown coupled to the shaft at the other end. That shaft is an idler shaft in this version. The belt is supported along an upper carryway portion on a conveyor pan 24 mounted in the conveyor frame. Shoes or rolls 25 reduce sag in the belt in the returnway path. Rollers 26 are arranged on the belt in longitudinal lanes spaced apart across the width of the belt from a left hand side 28 to a right hand side 29 and running the length of the belt.

The belt shown in FIG. 1 has four equally wide lanes 30L, 30R, 31L, 31R one roller wide. Each lane is defined by a longitudinal arrangement of rollers having similar characteristics. In this example, all the rollers in lane 30L rotate about axes 32 directed along a first direction at a first angle α relative to the direction of belt travel. All the rollers in lane 31L rotate about axes 33 directed in a second direction at a different second angle β relative to direction of belt travel. Preferably, the measures of α and β are equal if α is measured counterclockwise from the direction of belt travel and β is measured clockwise, or vice versa. Other angular relationships could be used in other applications. The lanes 30R and 31R include rollers oriented in the same two directions as those defining lanes 30L and 31L, respectively. In this way, the rollers are divided into two sets: a first set in first lanes 30L and 30R and a second set in second lanes 31L and 31R.

Underlying the belt along the carryway is a switch mechanism 34 that includes two wearstrips 36 connected by connecting rods 38. The tops of the wearstrips form bearing surfaces 40 that extend longitudinally along the carryway. The wearstrips are supported in the conveyor pan 24. Three- or four-sided metal channel can be used for the wear strip material.

Figure 2B:
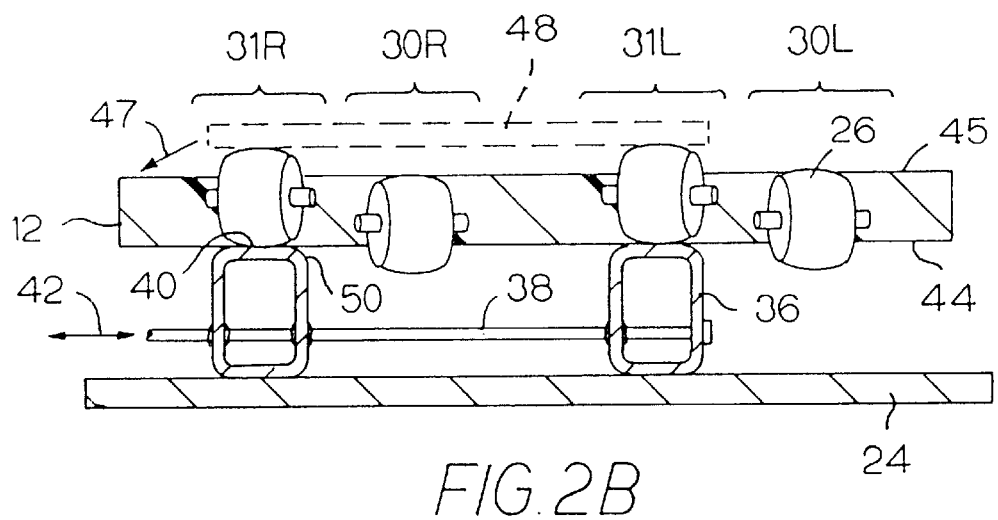
FIG. 2B is a view as in FIG. 2A, showing the switch in a second position.
Figure 2A:
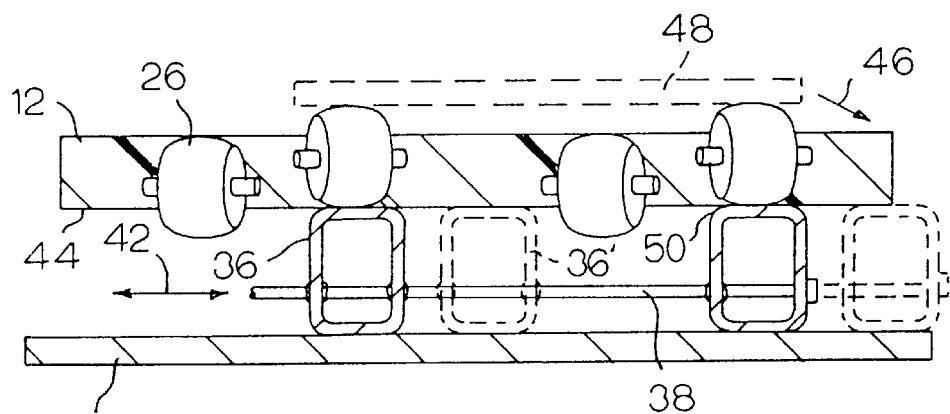
FIG. 2A is a front elevation cross section of the carryway portion of FIG. 1 taken along line 2—2, showing the switch in a first position.

As indicated by two-headed arrow 42, the two wearstrips 36 can slide in tandem across the conveyor pan with the bearing surfaces 40 contacting the rollers in either the first lanes or the second lanes at the bottom side 44 of the belt, as shown in FIGS. 2A and 2B. In FIG. 2A, the switch mechanism positions the wearstrips in a first position beneath the rollers in the first lanes 30L, 30R. As the belt advances in the direction of belt travel (out of the page in FIGS. 2A and 2B), the rollers in lanes 30L and 30R are rotated as they ride along the bearing surfaces 40. Because of the oblique arrangement of the roller axes, a component of force 46 pushes conveyed articles 48 to the right in FIG. 2A. It is also clear that the rollers in lanes 30L and 30R, in contact with the bearing surfaces, extend through both the top side 45 and the bottom side 44 of the belt. The rollers are retained in the belt, but can move vertically between lowered and raised positions. In FIG. 2A, the rollers in lanes 30L and 30R are raised to contact conveyed articles while the rollers in lanes 31L and 31R are lowered to a level at or below the top side of the belt and out of the way of conveyed articles. The rollers could, instead, be lowered to a level below the level of the raised rollers, but above the top side of the belt.

Just as conveyed articles are propelled toward the left side of the page in FIG. 2A, they are propelled toward the right side in FIG. 2B. In this case, the switch mechanism positions the wearstrip in a second position beneath the rollers in the second lanes 31L, 31R. The rollers roll on the bearing surfaces as the belt advances in the direction of belt travel and push conveyed articles to the left of the page as indicated by arrow 47.

Preferably, the rollers are generally cylindrical in shape with rounded edges to their peripheries. The edges 50 of the wearstrips bounding the bearing surfaces are also preferably rounded to prevent the wearstrips from catching on the rollers as the switch mechanism slides the wearstrips between positions.

The switch mechanism can also move the wearstrips to other than the two positions described. As shown in phantom in FIG. 2A, the wearstrips 36' are shown translated to a third position offset from the first and second lanes of rollers. This offset, or neutral, position can be between consecutive lanes, for example.

Figure 3:
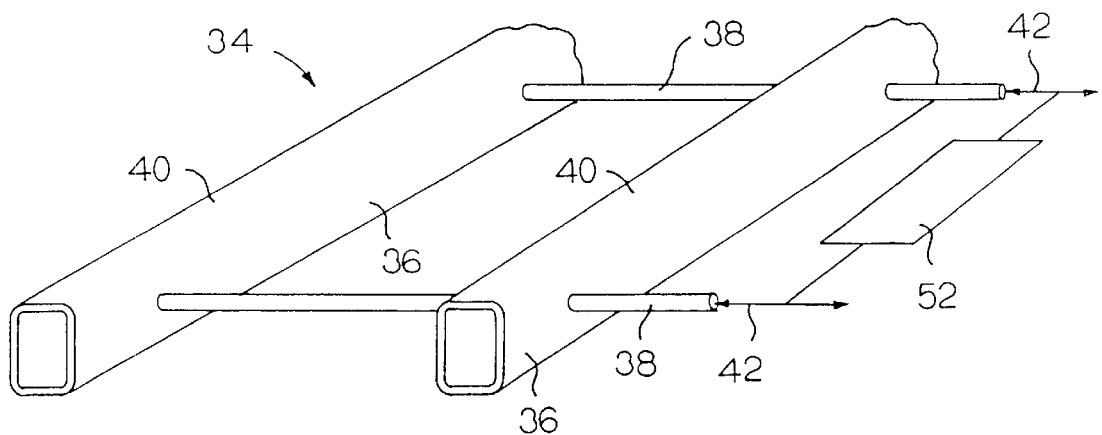
FIG. 3 is part isometric view, part schematic of the switch mechanism of FIG. 2.

The switch mechanism 34 is coupled to an actuator 52, schematically shown in FIG. 3. The actuator adjusts the switch mechanism between lanes of the conveyor. In the example shown, the actuator provides a pushing or a pulling force (represented by arrow 42) through the connecting rods 38 to the switch mechanism. The actuator may be a pneumatic actuator, a hydraulic actuator, a magnetic actuator, or a mechanical, including a manually-operated, actuator, for example.

Figure 4:
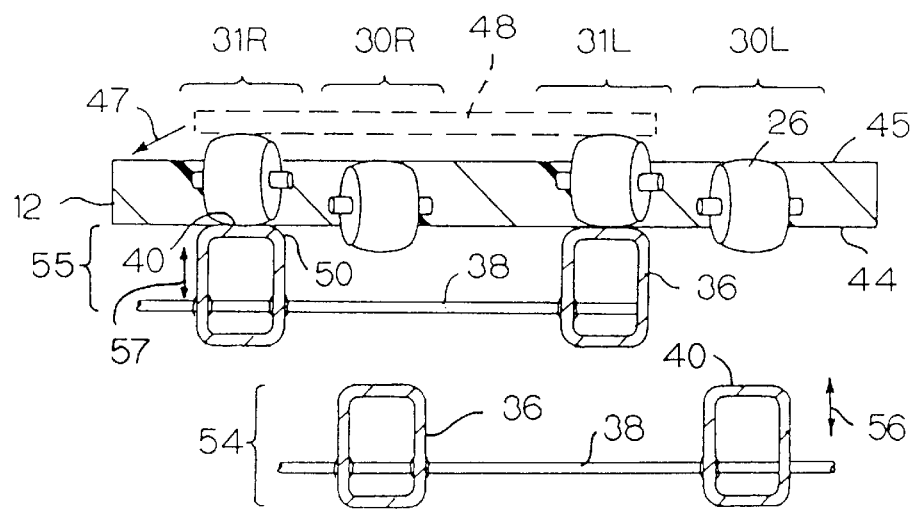
FIG. 4 is a front elevation view as in FIG. 2 of another version of switch mechanism usable in a switch conveyor as in FIG. 1.

In another version of the switch mechanism, shown in FIG. 4, a first set 54 of bearing surfaces 40 is raised and lowered 56 into and out of contact with the rollers in the first lanes 30L, 30R. A second set 55 of bearing surfaces 40 can be raised and lowered 57 into and out of contact with the rollers in the second lanes 31L, 31R. It is clear that the switch mechanism can be realized in a number of different ways to perform the function of selectably contacting the rollers in one group of lanes or another.

Although fabric or rubber belts with rollers can be used in the switch conveyor of this invention, modular plastic conveyor belts are preferred. Modular plastic conveyor belts serving many applications are available from, for example, Intralox, Inc., of Harahan, La., USA. These belts are typically constructed of a series of rows of one or more belt modules connected end to end by a hinge pin at a hinge joint to form a belt capable of articulating about a sprocket set or drum. The individual modules are typically injection molded out of a thermoplastic material, such as polypropylene, polyethylene, acetal, or a composite material including plastics. The hinge rods are made out of similar plastic materials, extruded or molded, or out of metal, such as stainless steel.

Figure 5:
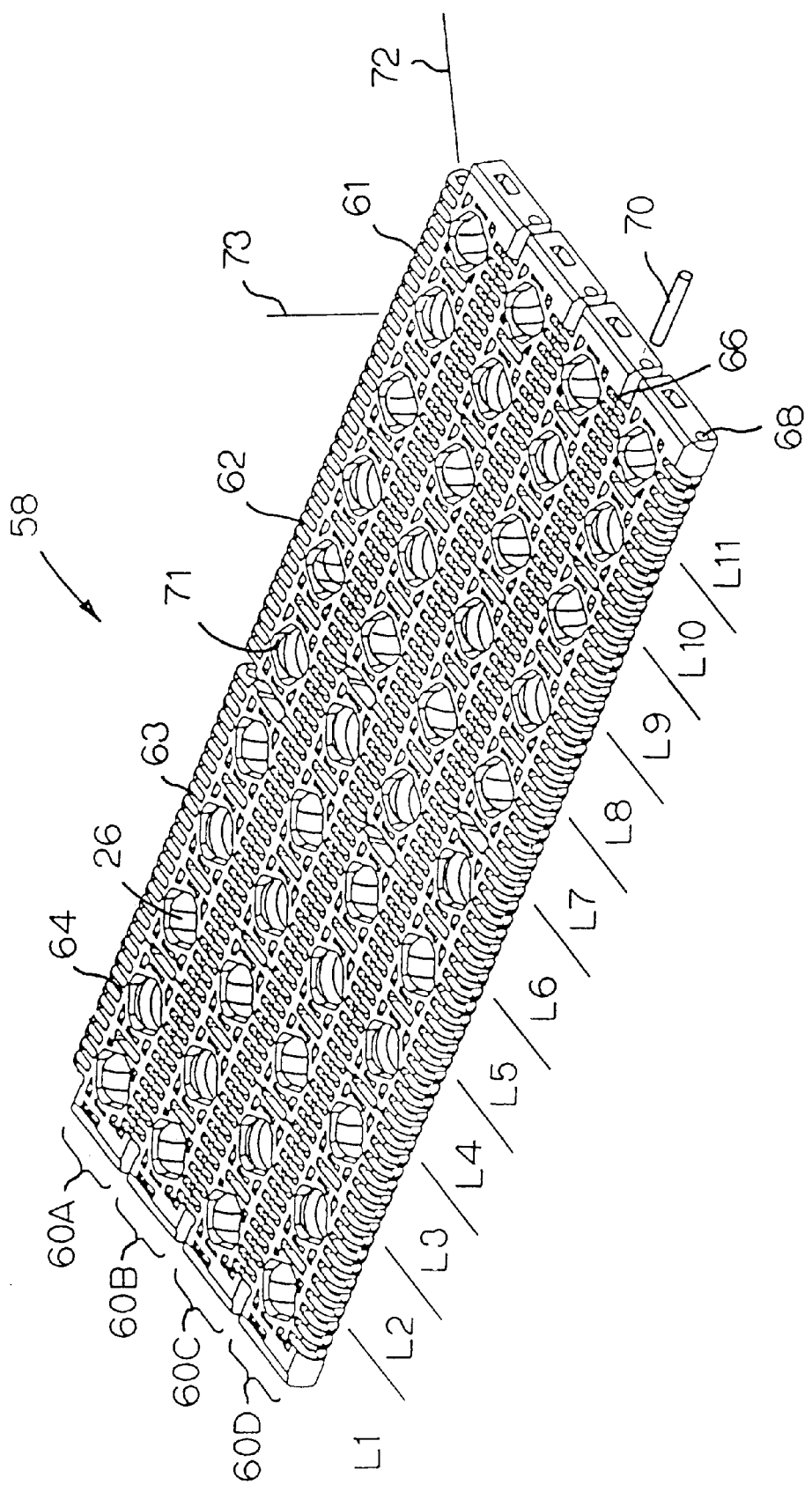
FIG. 5 is an isometric view of a portion of a modular conveyor belt usable in a switch conveyor as in FIG. 1.

A portion of a modular plastic belt usable in a switch conveyor is shown in FIG. 5. The belt section 58 is constructed of four rows 60A–D of belt modules, such as side-by-side modules 61, 62, 63, 64 in row 60A. Aligned apertures formed in interleaved hinge elements 66 of adjacent rows form a transverse passageway 68 that receives a hinge pin 70 to pivotably connect adjacent rows together. Cavities 71 formed in the modules accommodate the rollers 26. The belt section is divided into eleven longitudinal lanes L1–L11 across its width. All the rollers in the odd lanes rotate about axes oriented in a first direction 72; all the rollers in the alternate even lanes rotate about axes oriented in a different second direction 73. By moving the bearing surfaces between positions under the even lanes and the odd lanes, the switch mechanism causes conveyed articles to be propelled to the left or the right side of the conveyor.

Figure 6A:
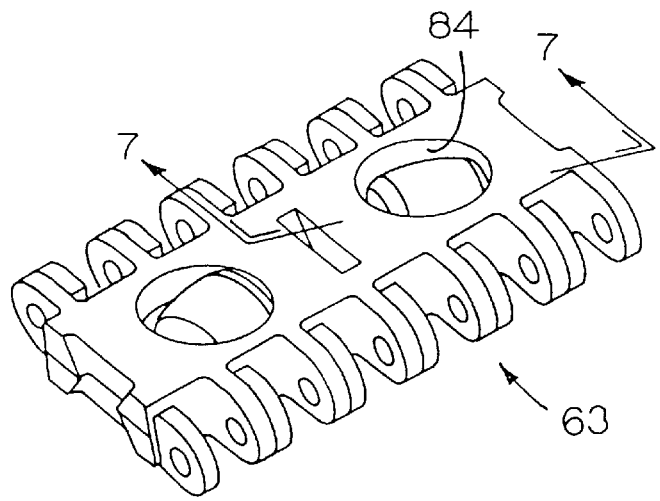
FIGS. 6A and 6B are isometric and exploded views of a portion of a module for a modular conveyor belt as in FIG. 5.
Figure 6B:
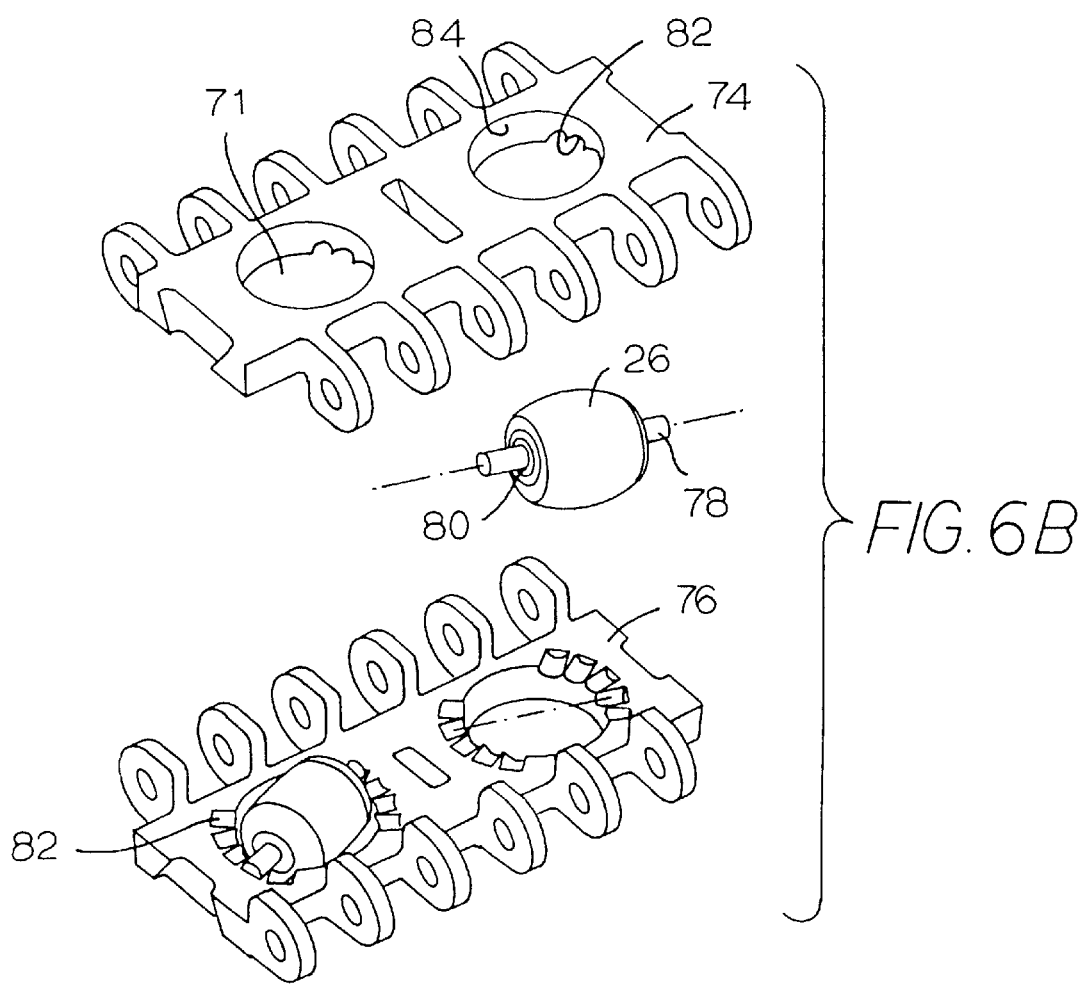

Further details of the modular plastic belt of FIG. 5 are shown in FIGS. 6A and 6B, which illustrate a portion of one of the modules, such as the module 63. The module is made of a top piece 74 and a bottom piece 76. General details of such a split module are described in co-pending U.S. patent application Ser. No. 09/992,765, SPLIT BELT MODULES IN MODULAR CONVEYOR BELTS, filed on Nov. 6, 2001, and incorporated herein by reference. The two module pieces sandwich an axle 78 on which a roller 26 is rotatably mounted. A bore 80 through the roller receives the axle. The module pieces have half slots 82 at various angular positions around the periphery of roller cavities 71. The variety of half-slot positions permits the axle to be oriented at one or more angles. For example, the two rollers in FIGS. 6A and 6B are oriented at different angles because they are positioned in different slot positions. In the completed module, the complementary top and bottom half slots form openings in a vertical wall 84 bounding the cavity.

Figure 7:
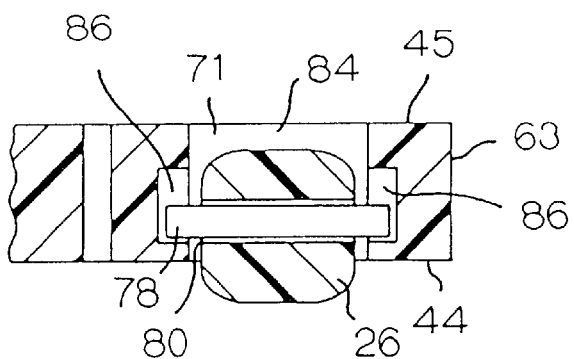
FIG. 7 is a cross section of a roller mounted in a conveyor belt as in FIG. 6A taken along line 7—7.

As shown in FIG. 7, the openings 86 in the vertical wall 84 of the cavity 71 have a vertical dimension greater than the diameter of the axle 78. This allows the axle to drop to the bottom of the opening by gravity in the absence of a bearing surface at the bottom side 44 of the belt. In this lowered position, the outer periphery of the roller is below the top side 45 of the belt or, at least, below the outer periphery of a roller in a raised position. When a bearing surface contacts the bottom side of the belt at the roller, it lifts the roller to a raised position in which the outer periphery of the roller protrudes from the top side of the belt above the lowered rollers to roll conveyed articles. Thus, because of the play that the enlarged cross section of the openings gives the axles, the vertical position of the rollers can be adjusted in the belt.

Figure 8:
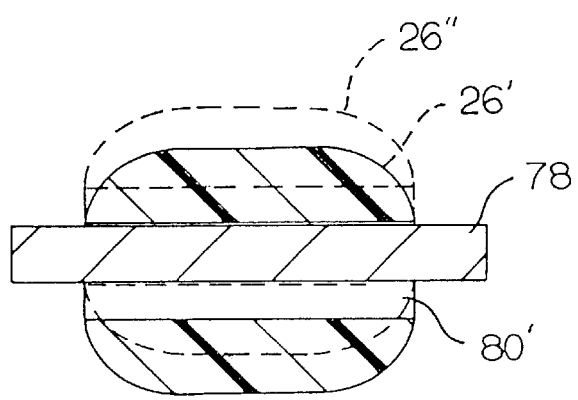
FIG. 8 is a cross section of another version of roller usable in a modular conveyor belt as in FIG. 5.

Sufficient play to allow the rollers to adjust vertically can alternatively be achieved with roller bores enlarged relative to the axles, as exemplified by the bore 80' shown in the roller 26' of FIG. 8. The circular bore's diameter, and so its cross sectional area, is greater than the diameter, and so the cross section, of the portion of the axle received in the bore. In this way, the rollers can be adjusted between a lowered position and a raised position (indicated by the roller 26" in phantom lines). The openings in the vertical walls of the cavity can be sized to receive the ends of the axles in a snug fit.

Figure 10:
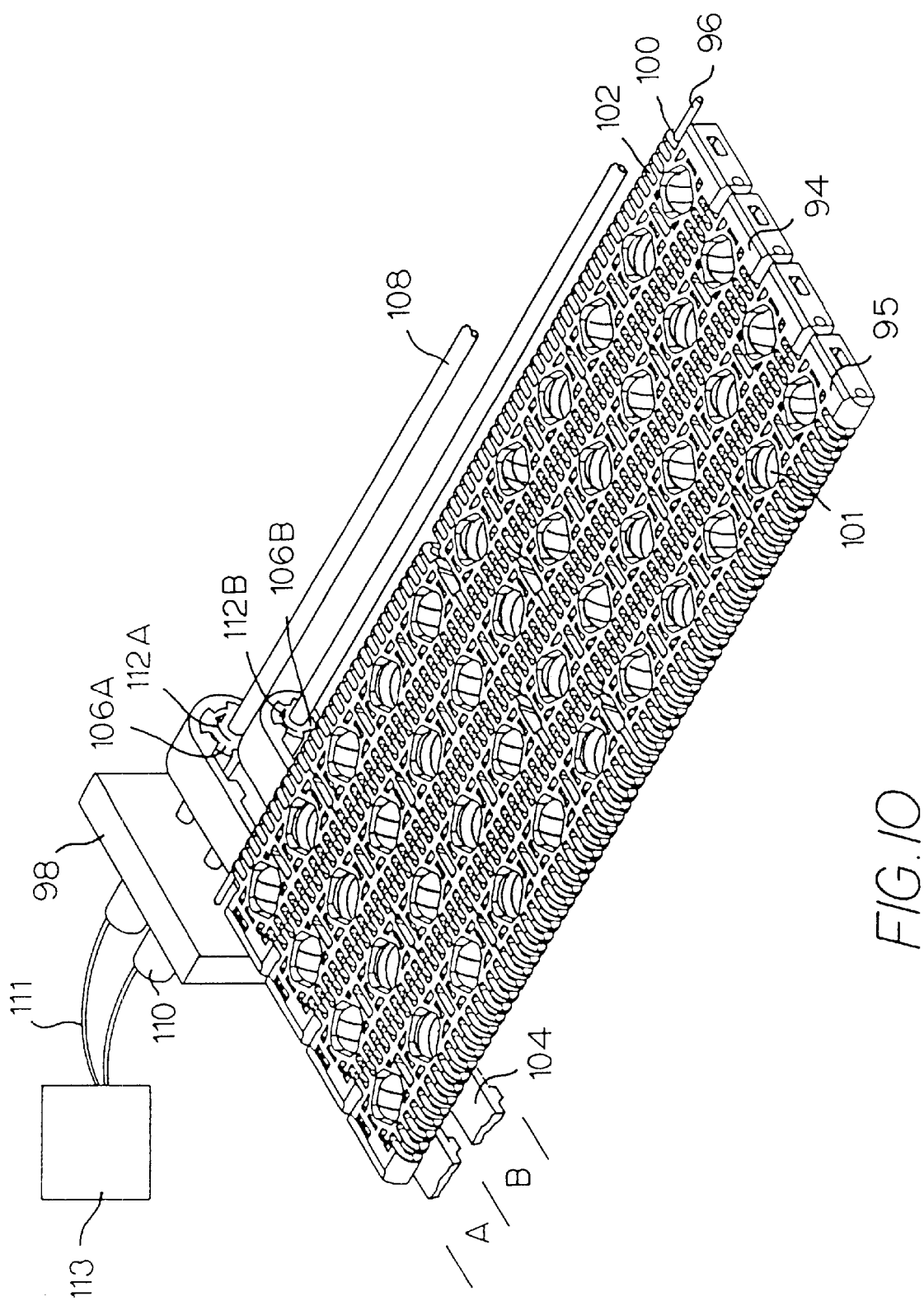
FIG. 10 is a part schematic, part isometric view of a portion of another version of switch conveyor including a stationary roller mat and moving-belt conveying surfaces embodying features of the invention.

Another version of switch conveyor is shown in FIG. 10. In this version, a conveyor mat 94 in the form of a series of rows of roller-top belt modules 95, such as in FIG. 5, is maintained in a stationary position by a retaining pin 96 secured to a conveyor frame 98. The retaining pin extends through aligned apertures 100 in hinge elements 102 at the outer ends of the two end modules forming the mat. (Only one end of the mat is shown in FIG. 10.) The mat includes rollers 101 arranged in longitudinal lanes such as lanes A and B. The rollers need not be vertically adjustable. All the rollers in lane A rotate about first axes parallel to each other. The rollers in lane B rotate about second axes parallel to each other, but not parallel to the first axes. A thin roller-drive belt, such as a cogged timing belt 104, underlies each lane. (Only two belts are shown in FIG. 10 to simplify the drawing.) Each belt is an endless belt looped between a cogged drive gear 106 at one end of the conveyor and a similar idler gear (not shown) at the other end. The drive gear wheels 106A associated with A lanes whose rollers rotate about the first axes are preferably mounted on a common drive shaft 108, which is coupled to a motor 110 supported by the frame. Motor control or power lines 111 connect to a switching logic circuit 113, which can be manually or automatically operated to turn the motor on and off as required. Thus, the switching logic circuit, the motors, the drive shafts, the drive gear wheels, and the belts compose a switching mechanism that selects which rollers to roll. Alternatives to the specific switching mechanism described include any means that causes the belts to selectively drive the roller lanes, such as through the use of clutches, tensioners, belt elevators, and so on. Preferably, each belt is slightly narrower than the width of a lane. To propel conveyed articles to the top left in FIG. 10, the lane A drive gearwheels 106A are rotated in the direction of arrow 112A, and the lane B drive gear wheels 106B are not rotated. To propel conveyed articles to the top right in FIG. 10, the lane B drive gear wheels 106B are rotated in the direction of arrow 112B, and the lane A drive gear wheels 106A are not rotated. Thus, the switch mechanism selectively rotates the A lane and the B lane rollers to direct conveyed articles toward one side edge of the conveyor or the other. Unlike the other conveyor versions in which the roller-top mat is a moving modular conveyor belt and the switch mechanism includes stationary drive surfaces selectably underlying roller lanes, the conveyor of this version has a stationary roller-top mat with a switch mechanism that includes selectably drivable roller-drive belts with moving outer bearing surfaces underlying the roller lanes. But both versions perform the same function of rotating the rollers in selected lanes.

Figure 9:
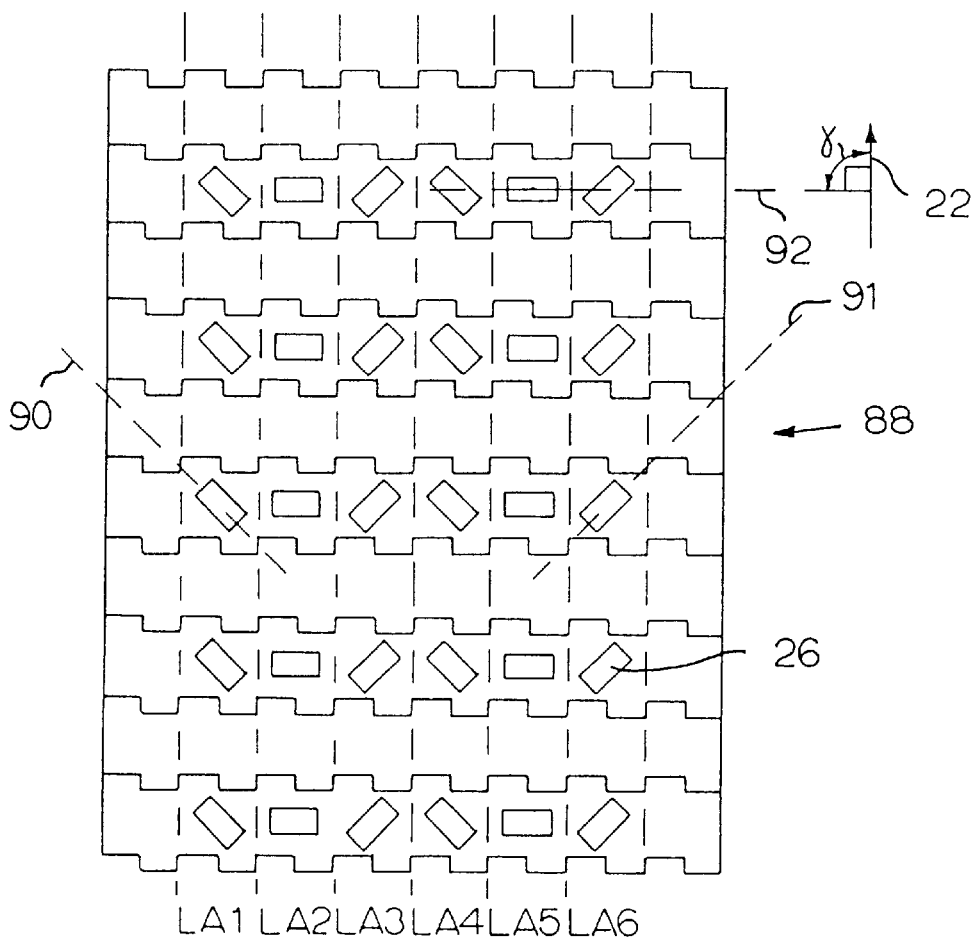
FIG. 9 is a top plan view of a portion of yet another version of a modular conveyor belt usable in a switch conveyor as in FIG. 1.

Yet another version of conveyor belt usable in the switch conveyor of the invention is shown in FIG. 9. In this belt 88, six lanes LA1–LA6 of linearly arranged rollers 26 are formed across its width. The rollers in first lanes LA1 and LA4 rotate about axes in a first direction 90. The rollers in second lanes LA3 and LA6 rotate about axes in a second direction 91. The rollers in third lanes LA2 and LA5 rotate about axes in a third direction 92. In this version, the angle γ formed between the third direction and the direction of belt travel is a right angle. When a belt like this is used in a switch conveyor such as that in FIG. 1 and the switch mechanism is moved between first, second, and third positions under the first, second, and third lanes, the conveyor can selectably direct articles toward the left side by rotating the rollers in second lanes LA3 and LA6, toward the right side by rotating the rollers in first lanes LA1 and LA4, or separate the articles longitudinally by rotating the rollers in the third lanes LA2 and LA5.

Thus, the invention provides a switch conveyor that uses a roller-top conveyor belt and an associated switch mechanism to selectably direct conveyed articles to one side or another of the conveyor as the belt advances along the carryway.

Although the invention has been described with reference to a few preferred versions, other versions are possible. For example, each lane could be more than one roller wide. The lanes need not all be the same width either. The rollers need not be perfectly linearly arranged in a longitudinal lane. Various roller spacings and densities depending on the footprints of the conveyed articles are possible. All the rollers in a lane need not be aligned on parallel axes. Modular plastic belts constructed of one-piece modules rather than split modules would work as well. The roller-driving belts could be any narrow belt with an outer surface capable of rotating the rollers as it travels. And the conveyor mat, shown as a modular plastic conveyor belt, could be a fabric belt with rollers or any sort of mat structure with longitudinal lanes of rollers. As these few examples suggest, the scope of the claims is not meant to be limited to the example versions described.

What I claim is:

1. A conveyor belt extending in width from a left side to a right side and in thickness from a top side to a bottom side and running longitudinally in a direction of belt travel along a carryway, comprising:

a plurality of first rollers arranged to rotate about first axes disposed at a first angle relative to the direction of belt travel, wherein the plurality of first rollers are arranged in parallel longitudinal first lanes;

a plurality of second rollers arranged to rotate about second axes disposed at a different second angle relative to the direction of belt travel, wherein the plurality of second rollers are arranged in parallel longitudinal second lanes;

wherein the first lanes and the second lanes are alternately formed across the width of the conveyor belt.

2. A conveyor belt as in claim 1 further comprising:

a plurality of third rollers arranged to rotate about third axes disposed at a third angle relative to the direction of belt travel, wherein the plurality of third rollers are arranged in parallel longitudinal third lanes.

3. A conveyor belt as in claim 2 wherein the third angle is a right angle.

4. A conveyor belt as in claim 2 wherein the first, second, and third lanes are alternately formed across the width of the belt.

5. A conveyor belt as in claim 1 wherein the measure of the first angle measured clockwise from the direction of belt travel is the same as the measure of the second angle measured counterclockwise from the direction of belt travel.

6. A conveyor belt as in claim 1 wherein the first and second lanes are each one roller wide.

7. A conveyor belt as in claim 1 wherein the first and second lanes are the same width.

8. A conveyor belt as in claim 1 wherein the rollers in each of the first and second lanes are linearly arranged in each lane.

9. A conveyor belt as in claim 1 wherein the first and second rollers have outer peripheries that extend through the thickness of the conveyor belt.

10. A conveyor belt as in claim 1 wherein the first and second rollers are adjustable between a raised position and a lowered position.

11. A conveyor belt as in claim 10 wherein an outer periphery of a roller in the raised position extends above the top side of the conveyor belt and the outer periphery of a roller in the lowered position is at or below the top side of the conveyor belt.

12. A conveyor belt as in claim 1 further comprising axles defining the first and second axes about which the first and second rollers rotate and wherein the belt supports the axles in openings having an area greater than the cross section of the axles to allow the axles to be adjusted between a raised position and a lowered position.

13. A conveyor belt as in claim 1 further comprising axles defining the first and second axes about which the first and second rollers rotate and wherein the first and second rollers define bores having a diameter sufficiently greater than the diameter of the axles to allow the axles to be adjusted between a raised position and a lowered position.

14. A switch conveyor comprising:

a conveyor belt as in claim 1; and a plurality of parallel longitudinal bearing surfaces underlying the conveyor belt along the carryway and selectably movable into and out of contact with the bottom side of the conveyor belt and the first and second rollers along the first lanes and the second lanes.

15. A switch conveyor as in claim 14 wherein the plurality of parallel longitudinal bearing surfaces translates between a first position underlying the first lanes and a second position underlying the second lanes.

16. A switch conveyor as in claim 15 wherein the plurality of parallel longitudinal bearing surfaces further translates to a third position offset from the first and second lanes.

17. A switch conveyor as in claim 14 wherein the plurality of parallel longitudinal bearing surfaces includes a first set of bearing surfaces adjustable into and out of contact with the bottom side of the conveyor belt along the first lanes and a second set of bearing surfaces adjustable into and out of contact with the bottom side of the conveyor belt along the second lanes.

18. A switch conveyor comprising:

a modular conveyor belt including:

a series of rows of belt modules hingedly connected end to end by hinge pins into a conveyor belt, at least some of the rows including rollers extendable above and below top and bottom sides of the belt;

wherein the rollers include a first group of rollers rotatable about axes generally in a first direction and a second group of rollers rotatable about axes generally in a different second direction; and wherein the first group of rollers is arranged in spaced apart longitudinal first lanes and wherein the second group is arranged in spaced apart longitudinal second lanes; and a switch mechanism underlying the belt along a carryway portion of the conveyor and selectably adjustable between contact with the first group of rollers at the bottom side of the belt under the first lanes to rotate the first group of rollers as the belt moves in a direction of belt travel and contact with the second group of rollers at the bottom side of the belt under the second lanes to rotate the second group of rollers as the belt moves in the direction of belt travel.

19. A switch conveyor as in claim 18 wherein the rollers are raised above the top side of the belt while in contact with the switch mechanism and lowered to or below the top side of the belt while out of contact with the switch mechanism.

20. A switch conveyor as in claim 18 wherein the first group of rollers rotating about axes in the first direction provides a component of force to conveyed articles toward a first side edge of the belt and wherein the second group of rollers rotating about axes in the second direction provides a component of force to conveyed articles toward an opposite second side edge of the belt.

21. A switch conveyor as in claim 18 wherein the angle between the first and second directions is bisected by the direction of belt travel.

22. A switch conveyor as in claim 18 wherein the modular conveyor belt comprises belt modules including:

interior vertical walls bounding cavities opening onto the top and bottom sides of the belt module from which peripheries of the rollers extend, the vertical walls forming opposite openings;

axles extending through the rollers and defining the axes, the axles spanning the cavities and supported at opposite ends in the openings, wherein the openings have a vertical dimension greater than the diameter of the ends of the axles.

23. A switch conveyor as in claim 18 wherein the switch mechanism includes a plurality of parallel longitudinal bearing surfaces.

24. A switch conveyor as in claim 23 wherein the plurality of parallel longitudinal bearing surfaces translates between a first position underlying the first lanes and a second position underlying the second lanes.

25. A switch conveyor as in claim 24 wherein the plurality of parallel longitudinal bearing surfaces further translates to a third position offset from the first and second lanes.

26. A switch conveyor as in claim 23 wherein the plurality of parallel longitudinal bearing surfaces includes a first set of bearing surfaces adjustable into and out of contact with the bottom side of the conveyor belt along the first lanes and a second set of bearing surfaces adjustable into and out of contact with the bottom side of the conveyor belt along the second lanes.

27. A switch conveyor as in claim 18 wherein the rollers define central bores therethrough and wherein the modular conveyor belt comprises axles defining the axes in the first and second directions and wherein the cross section of the bores is sufficiently greater than the cross section of the axles to allow the rollers to be adjusted vertically between two positions by contact with the switch mechanism.

28. A switch conveyor comprising:
   a conveyor mat divided across its width into a plurality of longitudinal lanes of rollers wherein all the rollers in each lane are arranged to rotate about parallel axes and the rollers of adjacent lanes rotate about non-parallel axes; and
   a switch mechanism underlying a carryway portion of the switch conveyor and adjustable between lanes to rotate the rollers of alternately selectable lanes.

29. A switch conveyor as in claim 28 wherein the conveyor mat includes alternating first and second lanes of rollers, wherein the rollers in the first lanes rotate about first axes and the rollers in the second lanes rotate about different second axes.

30. A switch conveyor as in claim 28 wherein the conveyor mat includes alternating first, second, and third lanes of rollers, wherein the rollers in the first lanes rotate about first axes, the rollers in the second lanes rotate about different second axes, and the rollers in the third lanes rotate about different third axes.

31. A switch conveyor as in claim 28 wherein the switch mechanism includes a plurality of longitudinal bearing surfaces underlying the conveyor mat along the carryway portion of the switch conveyor and rotating the rollers by contact through relative longitudinal motion between the conveyor mat and the longitudinal bearing surfaces.

32. A switch conveyor as in claim 31 wherein the switch mechanism translates the longitudinal bearing surfaces back and forth to alternately contact the rollers in one set of lanes or another.

33. A switch conveyor as in claim 31 wherein the longitudinal bearing surfaces includes a first set of longitudinal bearing surfaces and a second set of longitudinal bearing surfaces and wherein the switch mechanism alternately puts the first set in contact with selected lanes and the second set in contact with other selected lanes.

34. A switch conveyor as in claim 31 wherein the switch mechanism raises and lowers the longitudinal bearing surfaces into and out of contact with the conveyor mat.

35. A switch conveyor as in claim 28 wherein the rollers are adjustable between raised and lowered positions.

36. A switch conveyor as in claim 28 further comprising an actuator coupled to the switch mechanism to adjust the switch mechanism between lanes of the conveyor, wherein the actuator is selected from the group consisting of mechanical actuators, pneumatic actuators, hydraulic actuators, and magnetic actuators.

37. A switch conveyor as in claim 28 wherein the conveyor mat is a stationary conveyor belt.

38. A switch conveyor as in claim 37 wherein the switch mechanism comprises a plurality of longitudinal belts, each belt underlying a lane and having an outer bearing surface selectably movable in a longitudinal direction.

39. A switch conveyor as in claim 38 wherein the longitudinal belts are timing belts.

40. A switch conveyor as in claim 28 wherein the conveyor mat is an endless modular conveyor belt traveling in a longitudinal direction.

* * * * *